Aug. 7, 1928.
H. E. FRASIER
1,679,716
BATTERY CONNECTION
Filed March 29, 1921
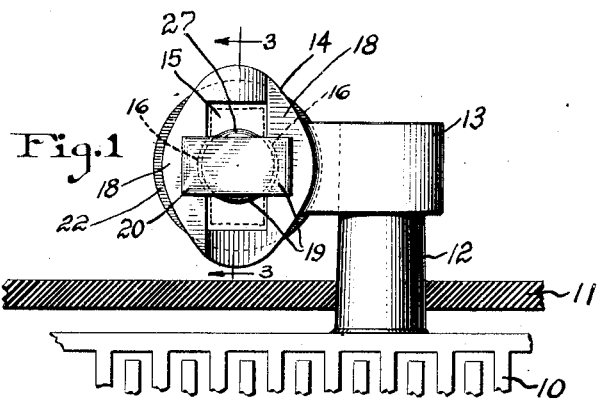
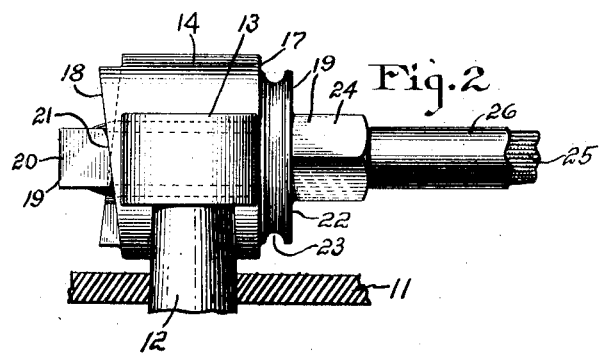
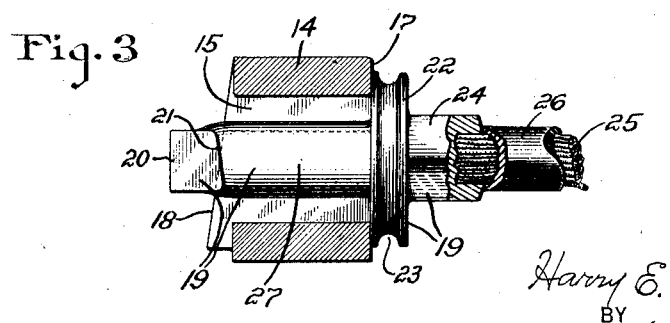
INVENTOR
Harry E. Frasier
BY
ATTORNEY Patented Aug. 7, 1928.

1,679,716

UNITED STATES PATENT OFFICE.

HARRY E. FRASIER, OF DEVON, CONNECTICUT, ASSIGNOR OF ONE-THIRD TO ODESSA G. MARSH, OF DEVON, CONNECTICUT.

BATTERY CONNECTION.

Application filed March 29, 1921. Serial No. 456,714.

This invention relates to connectors for attaching electric conductors to the electrodes of storage and other batteries.

In the use of connectors of this character as heretofore made, particularly when employed with storage batteries, considerable difficulty has been encountered due to the corrosive action of the electrolyte upon the connector and the conductor attached thereby, which electrolyte displays a marked tendency to creep upwardly from the battery cell to the connector and attack the latter, and also to creep from the connector to the conductor proper. Various attempts have been made to overcome this difficulty by the use of materials which will not be thus effected by the electrolyte, but so far as I am aware none of these attempts have met with complete success. It is, of course, essential that the material of the connector be of good electric conductivity, which practically necessitates the use of metal for this purpose. It is found however that all of the hard metals commercially available for this purpose are subject to the corrosive influence of the electrolyte. Certain of the softer metals, particularly lead, are non-corrodible by the electrolyte, but their use alone has heretofore been precluded by the mechanical difficulties involved in making therefrom a coupling which may be securely joined, which will afford the necessary electrical contact, and which will withstand the conditions of use.

The present invention has for its object to provide a connector or coupling which is of such a character that it may be made of relatively soft material, which is of simple and substantial construction, which will permit the conductor to be easily and quickly connected and disconnected, which will insure the proper electric contact between the parts, which will securely retain the parts in connecting position until positively disconnected, and which is provided with means for preventing the electrolyte from passing the same and coming in contact with the conductor proper.

With the foregoing and other objects in view, I have devised the novel electric coupling or connector which I will now describe, reference being had to the accompanying drawings, in which:

Fig. 1 is an end elevation of the coupling, a portion of the battery cell being shown in section.

Fig. 2 is a side elevation of the coupling as viewed from the right in Fig. 1.

Fig. 3 is a vertical section taken substantially on the line 3—3, Fig. 1.

10 denotes an electrode of a battery cell and 11 the cover of said cell. The electrode 10 is provided with a preferably integral stem 12 which extends through a suitable opening in the cell cover 11. The upper end of the stem 12 is received in a vertical opening in an integral lug 13 projecting laterally from a fixed coupling member 14, said lug being welded or fused to said stem, as is usual in devices of this character. The coupling member 14 as shown is of the general form of a horizontal cylinder of approximately eliptical cross section, and is provided with a central, longitudinal, cylindrical bore 16 intersected by a longitudinal opening 15 of preferably substantially rectangular cross-section which is of greater dimension in one direction than in the other. Preferably the opening 15 is disposed with its greater dimension vertical, being of greater height and less width than the bore 16. The coupling member 14 is further formed at one end with a flat contact surface 17 and at its opposite end with one or more (preferably two) helical cam surfaces 18 of equal pitch.

19 denotes a complementary detachable coupling member having a cylindrical stem 27 of substantially circular cross-section corresponding approximately in diameter to the bore 16 and being insertible longitudinally into the fixed coupling member 14 and rotatable therein. At the outer end of the stem 27 the coupling member 19 is formed with a T-shaped head 20 corresponding approximately in shape to the cross sectional form of the opening 15, said head having inclined shoulders 21 adapted to engage and cooperate with the cam surfaces 18 on the end of the coupling member 14. At the opposite end of the cylindrical stem 27 from the head 20, the coupling member 19 is provided with a circular flange 22 providing a contact surface adapted to engage the surface 17 of the fixed coupling member 14, said flange having a peripheral groove 23 for a purpose hereinafter explained. Beyond the flange 22 the coupling member 19 is formed with means whereby the same may be conveniently rotated, said means, as herein shown, comprising a square or other noncircular wrench receiving portion 24. The end of a cable 25 constituting the conductor to be connected is embedded in the material of the coupling member 19 at the extreme inner end thereof, said cable being preferably provided with the usual insulating covering 26.

In making the connection, the coupling member 19 is turned into a position in which the head 20 registers with the opening 15 in the coupling member 14 (as shown in dotted lines in Fig. 1) and said head is passed longitudinally through said opening until the flange 22 engages the end surface 17 of said coupling member 14, the cylindrical stem of the coupling member 19 being thereby seated in the bore 16. The coupling member 19 is then rotated through an angle of approximately 90°, turning the head 20 into a position transverse to the opening 15 (as shown in full lines in Fig. 1) and thereby holding the coupling member 19 against withdrawal. During this turning movement, engagement of the inclined shoulders 21 on the head 20 with the cam surfaces 18 on the coupling member 14 will cause the flange 22 to be forced into close engagement with the end surface 17 of said coupling member 14, thereby insuring an adequate electric contact between the parts. By the application of a wrench to the square portion 24 of the coupling member 19, the parts may be wedged together with any desired degree of tightness, thereby rendering the connection self-locking against accidental disengagement, although, by again applying said wrench, they may be readily disconnected when desired.

It will be seen that the parts of the connector above described are all of relatively massive and substantial form, requiring no careful fitting and not seriously affected in their function and operation by minor malformation. It is therefore possible to construct both coupling members 14 and 19 of relatively soft material, so that a non-corrodible metal of good electric conductivity may be used. For this purpose I prefer to employ lead which may, in some instances where a greater hardness is desired in order to meet special requirements, be alloyed with a small quantity of antimony. When composed of such a material the coupling members will not be corroded by the action of such electrolyte as may be brought into contact therewith, while the flange 22 acts as a guard to prevent the electrolyte from creeping past the connector and reaching the conductor 25. It will be seen that any electrolyte reaching the periphery of the flange 22 will accumulate in the groove 23 thereof and will drip from the edges of said flange adjacent said groove.

Having thus described my invention, I claim:

1. A connector for battery electrodes comprising a pair of cooperating coupling members secured respectively to the electrodes and to the conductor to be connected, said members being composed of a relatively soft substantially inelastic electric conducting material, one of said members having an opening therethrough and a cam surface adjacent said opening, and the other of said members having a transversely extending part insertable through said opening and a stop shoulder spaced therefrom, said transversely extending part being adapted to engage said cam surface and clamp the first member against said stop shoulder by the camming action of the cam surface against the transversely extending part of the other member as said member is rotated.

2. A connector for battery electrodes comprising a pair of cooperating coupling members, one of said members being attached to the electrode and having a longitudinal opening of greater cross sectional dimension in one direction than in another, said member having contact and cam surfaces at its opposite ends respectively, and the other of said members being attached to the conductor to be connected and having a guard flange provided with a peripheral groove to collect electrolyte and cause it to drop off before reaching said conductor, said last named member having a head insertable through the opening in said first named member and rotatable to engage the cam surface thereon and by camming action of said cam surface on said head as the member is rotated to force said flange into close engagement with the contact surface of said first named member and clamp the member between the head and flange.

3. A connector for battery electrodes comprising a pair of cooperating coupling members composed of relatively soft substantially inelastic electric conducting material, one of said members being attached to the battery electrode and having an elongated opening therethrough with inclined cam surfaces on opposite sides of said opening, the other of said members being secured to the conductor to be connected, said latter member being substantially T-shaped and provided with a shoulder spaced from the cross bar, said member extending through the opening in the first member and said cross bar adapted on rotation of the member to engage the cam surfaces and by the camming action of the cam surfaces on the under side of the cross bar as the member is rotated to clamp the first mentioned member between the cross bar and said shoulder.

In testimony whereof I affix my signature.

HARRY E. FRASIER.